United States Patent
Massner et al.

(10) Patent No.: US 9,962,593 B1
(45) Date of Patent: May 8, 2018

(54) SYSTEM AND METHOD FOR MEASURING BASEBALL CATCHER RESPONSE TIME

(71) Applicant: Accu-Pop, L.L.C., Council Bluffs, IA (US)

(72) Inventors: Kirk Massner, Burlington, IA (US); Ronald D. Crowl, Council Bluffs, IA (US); Matthew Wiskus, Coralville, IA (US)

(73) Assignee: ACCU-POP, L.L.C., Council Bluffs, IA (US)

( * ) Notice: Subject to any disclaimer, the term of this patent is extended or adjusted under 35 U.S.C. 154(b) by 96 days.

(21) Appl. No.: 15/331,103

(22) Filed: Oct. 21, 2016

Related U.S. Application Data

(60) Provisional application No. 62/245,448, filed on Oct. 23, 2015.

(51) Int. Cl.
| | |
|---|---|
| *G06F 19/00* | (2018.01) |
| *A63B 71/06* | (2006.01) |
| *G04F 10/00* | (2006.01) |
| *G01L 5/00* | (2006.01) |
| *A63B 24/00* | (2006.01) |

(52) U.S. Cl.
CPC ...... *A63B 71/0686* (2013.01); *A63B 24/0062* (2013.01); *G01L 5/0052* (2013.01); *G04F 10/00* (2013.01)

(58) Field of Classification Search
CPC ............ A63B 2225/50; A63B 2225/54; A63B 2220/836
USPC .................................. 702/176, 182–185, 188
See application file for complete search history.

(56) References Cited

U.S. PATENT DOCUMENTS

| | | | | |
|---|---|---|---|---|
| 6,148,271 | A * | 11/2000 | Marinelli | A63B 43/00 473/198 |
| 6,378,367 | B1 * | 4/2002 | Dilz, Jr. | A63B 24/0021 73/167 |
| 2006/0189386 | A1 * | 8/2006 | Rosenberg | A63F 13/12 463/37 |
| 2010/0184563 | A1 * | 7/2010 | Molyneux | A43B 1/0054 482/1 |
| 2015/0019135 | A1 * | 1/2015 | Kacyvenski | A61B 5/0488 702/19 |
| 2015/0238835 | A1 * | 8/2015 | Ripken, Jr. | A63B 69/0002 473/451 |
| 2015/0343287 | A1 * | 12/2015 | Stover | A63B 69/0002 473/458 |
| 2016/0125234 | A1 * | 5/2016 | Ota | G06T 7/20 382/103 |
| 2017/0232296 | A1 * | 8/2017 | Niegowski | A63B 24/0006 473/223 |
| 2017/0243359 | A1 * | 8/2017 | Bose | G06T 7/20 |

* cited by examiner

*Primary Examiner* — Edward Raymond
(74) *Attorney, Agent, or Firm* — Erickson Kernell IP, LLC

(57) ABSTRACT

Disclosed is a system for measuring a baseball or softball catcher's response, or "pop" time. The system includes a first sensor operable to detect a catcher catching a pitched ball, a second sensor operable to detect a baseman catching a ball thrown by the catcher, and a device with circuitry operable to calculate a pop time based on signals from the first and second sensors. Alternative embodiments allow measurement of time for a pitcher to deliver a pitch to the catcher, and other throwing and catching sequence metrics. Also disclosed are accompanying methods.

22 Claims, 8 Drawing Sheets

SYSTEM AND METHOD FOR MEASURING BASEBALL CATCHER RESPONSE TIME

CROSS-REFERENCE TO RELATED APPLICATIONS

This application claims priority to U.S. Provisional Application for Patent Ser. No. 62/245,448, filed on Oct. 23, 2015, which is hereby incorporated herein in its entirety by reference.

FIELD OF THE INVENTION

The present invention relates to measuring players' time metrics in sporting events, and more particularly relates to systems and methods for measuring a baseball catcher's response or pop time, the time it takes for a catcher to throw a ball to a base after receiving a pitch.

BACKGROUND

In baseball, pop time is the amount of time it takes for a catcher to throw a ball to a base after the catcher receives a pitch from the pitcher—i.e., the response time of the catcher. While pop time is typically measured with respect to throws to second base, e.g., in the case of a catcher attempting to throw out an offensive player attempting to steal second base, the pop time with respect to throws to first or third base, or any other target, can likewise be measured. Pop time is a very important metric as it provides an indication of the combined reflex, reaction, and physical abilities of a catcher, after receiving a pitch from the pitcher, to throw out a runner attempting to steal a base or to throw out a baserunner at first or third base who has taken too large of a lead-off.

Current methods for measuring a catcher's pop time are primarily manual, and rely on an individual (e.g., a coach) with a stop watch standing near the pitcher's mound or circle. The coach starts the stopwatch when he or she hears the "pop" or sound of the ball, thrown by a pitcher, hitting the catcher's mitt—and stops the stopwatch when he or she hears the pop of the ball, thrown by the catcher, hitting the glove of the player located at the target base (e.g., first, second, or third).

This manual method of timing introduces human error based on the overall reaction time of the stopwatch operator in starting and stopping the stopwatch. The same stopwatch operator can have different reaction times watching the same event over and over, which results in a lack of repeatability. Variations in the stopwatch operator's alertness, positioning, weather conditions, and other variable factors can all affect the ability to accurately start and stop the stopwatch. And, different stopwatch operators will typically have different reaction times, such that two coaches with stopwatches, side-by-side, measuring the same event, often have varying pop time measurements for the exact same event. Thus, current methods of measuring pop-time can result in timing errors that distort the actual pop time by as much as two tenths (0.2) of a second.

Because an average pop time for a baseball catcher in National Collegiate Athletic Association (NCAA) Division 1 baseball is approximately 2.0 seconds, an error or variance of two tenths of a second in measuring pop time can greatly distort a catcher's actual ability. For example, an outstanding pop time for a baseball catcher throwing to second base is 1.80 seconds. An average pop time is 2.0 seconds. Thus, because of stopwatch operator variance, a catcher may have one stopwatch operator record a 1.80 second pop time and a second stopwatch operator record a 2.0 second pop time. If the first stopwatch operator is timing the event and records a 1.80 second pop time, that catcher will likely be in line for an NCAA Division 1 scholarship offer or a Major League Baseball draft pick. However, if the second stopwatch operator is timing the event and records a 2.0 second pop time, that same catcher might not receive any offers at all based on that recorded time.

Other player throwing and catching metrics are also valuable, such as a pitcher's release time, the pitcher's release time in combination with a catcher's pop time, and the time for any player to make a throw after catching the ball.

Thus, it can be seen that there remains a need in the art for a system and method to accurately record player response time metrics.

SUMMARY

The present invention is directed to systems and methods for measuring baseball or softball throwing and catching time metrics. In one aspect, the system and method measures a catcher's pop time, or response time, in catching a pitched ball and throwing the ball to a designated target—e.g., first, second, or third base. In another aspect, the system and method measure the overall time for a pitcher to release a ball to the catcher, and for the catcher to throw the ball to the designated target.

In one exemplary embodiment, the system includes a first sensor operable to detect a catcher catching a pitched ball, a second sensor operable to detect a baseman catching the ball thrown by the catcher, and logic and control circuitry operable to receive signals from the first and second sensors indicative of the caught ball and to calculate the time between the two catches.

In an exemplary embodiment, the first and second sensors are sensors positioned within a catcher's mitt and baseman's glove, respectively, in wireless communication with the logic and control circuitry. In alternative embodiments, the sensors are positioned within a wristband, watch, or glove worn by the catcher and baseman prior to donning the glove or mitt. In further embodiments, the sensors are positioned or worn on a player's foot or leg.

In one embodiment, the logic and control circuitry includes, or is in communication with, a display operable to present to an operator the measured pop time for each throwing sequence. In alternative embodiment, a central system stores data for each throwing sequence, correlates the stored data with particular players, and allows multiple users to access and view the data based upon permissions granted to those users. In other embodiments, the logic and control circuitry is integrated into one or more of the sensors so that time measurements are captured locally, with the sensor then transmitting the results to other logic and control circuitry for display and recording.

In further embodiments, the system includes a third sensor worn by a pitcher, operable to detect the start of the pitcher's delivery of the ball to the catcher by detecting movement of the pitcher's stride foot after coming set during the pitching motion. The third sensor is in wireless communication with the logic and control circuitry and the circuitry is operable to calculate an overall response time for the throwing sequence, from the start of the pitcher's delivery to the catch by the catcher, and the catch of the ball by the baseman.

In an alternative embodiment, the second sensor associated with the baseman is comprised of an array of sensors positioned on a target placed at the desired base. The sensor array is operable, in conjunction with the logic and control circuitry, to detect the impact of the ball thrown by the catcher as well as the position of the ball on the target, i.e., where the ball was thrown to determine the accuracy of the throw from the catcher to the base.

In one aspect, the recorded data for each throwing sequence is stored on a central system and is associated with a particular player, team, coach, or other logical association. The data is accessible to various users accessing the system through a wired or wireless network, such as the Internet, based on permissions granted to those users.

Thus, the system and method of the present invention facilitate measurement of catcher pop time and overall pitcher/catcher throwing time.

DESCRIPTION OF THE DRAWINGS

Illustrative embodiments of the invention are described in detail below with reference to the attached drawing figures, and wherein.

DETAILED DESCRIPTION OF EXEMPLARY EMBODIMENTS

Systems and methods in accordance with the present invention for measuring catcher reaction time and other player throwing and catching metrics will now be described with respect to various exemplary embodiments depicted in FIGS. 1 through 10. It should be understood that the embodiments described are exemplary, and not limiting, and that other configurations or arrangements of system components and method steps are contemplated by the present invention.

Figure 1:
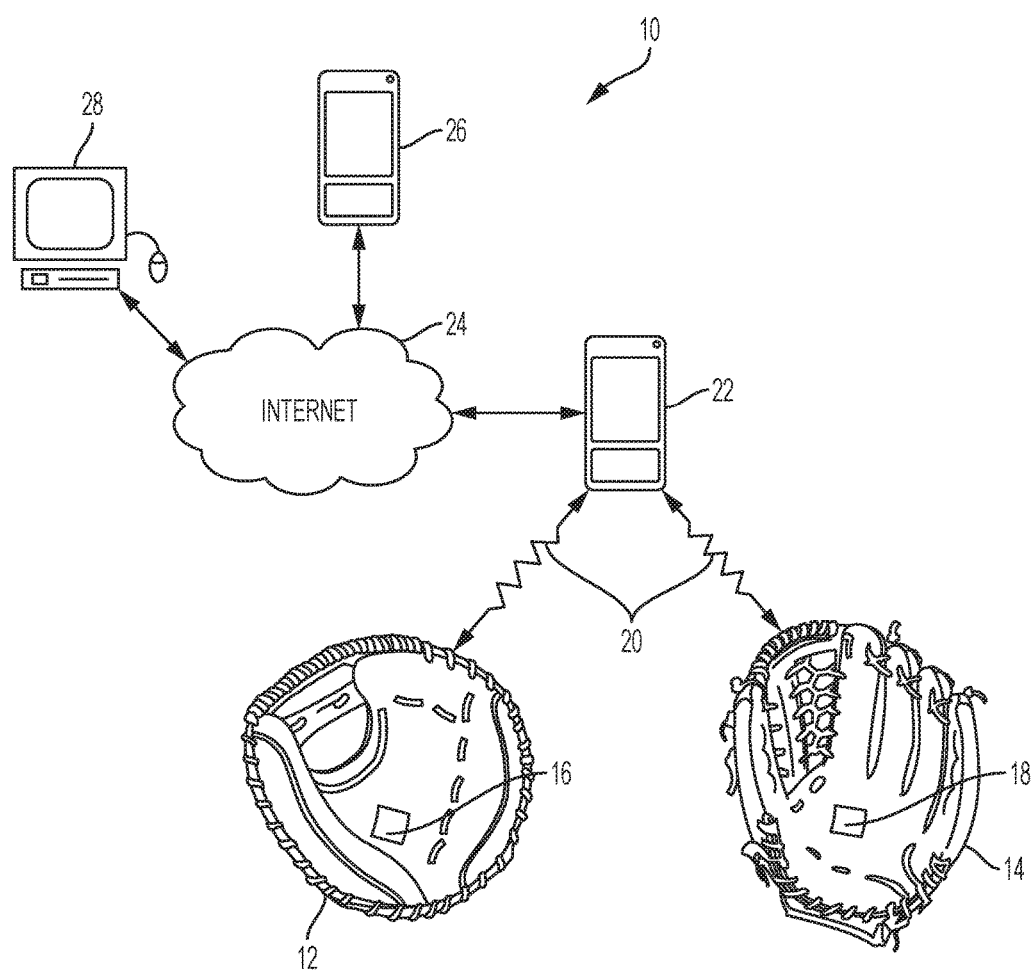
FIG. 1 is a schematic diagram of a system for measuring a baseball catcher's response time in accordance with an exemplary embodiment of the present invention.

Looking first to FIG. 1, a system for measuring and capturing a baseball catcher's pop time in accordance with an exemplary embodiment of the present invention is depicted generally by the numeral 10. The system 10 includes a catcher's mitt 12 and a baseman's glove 14 to be worn by a respective catcher and baseman, with an embedded sensor 16, 18 positioned in the palm portion of each of the mitt and glove, respectively. Sensors 16, 18 are operable to detect an impact of a thrown ball hitting the glove or mitt, and to transmit a signal indicating detection of that impact to logic and control circuitry 22 over corresponding communications links 20.

Preferably, sensors 16, 18 are accelerometer type sensors and include circuitry allowing calibration and adjustment of the sensitivity of the sensor, as well as communication circuitry to facilitate wireless communication over Bluetooth, Wi-Fi, or any other wireless or wired communications protocol. In alternative embodiments, the sensor may employ circuitry or mechanisms other than an accelerometer to detect impact, such as a reed switch with a predetermined spring coefficient operable to detect an impact meeting or exceeding the spring threshold. In other embodiments, the sensor may be an audio sensor operable to detect a sound generated by a thrown ball hitting the glove or mitt.

Communications links 20 preferably employ a wireless communications protocol to allow transmitting and receiving signals over Bluetooth, Wi-Fi, or other wireless communications means. Most preferably, communications links 20 allow two-way communication between the sensors 16, 18 and the logic and control circuitry 22 so that, in addition to receiving signals indicating impact from the sensors, the logic and control circuitry can verify the communications path to the sensors 16,18 to ensure system integrity prior to initiating a response time timing sequence. In alternative embodiments, the communications links 20 between the sensors 16, 18 and the logic and control circuitry can be hardwired.

Logic and control circuitry 22 preferably includes a processor and memory having programmed steps for the processor to execute various functions and for timing of various events to be completed. The logic and control circuitry 22 further includes circuitry and/or programmed functionality of a clock or timing signal, most preferably with an accuracy of at least one one-thousandth ($1/1000$) of a second. The logic and control circuitry also preferably includes a display capable of displaying elapsed time information, most preferably the display can also present information associated with a particular displayed time, such as a player's, name, team, coach, and the like. The logic and control circuitry 22 preferably includes internal memory for recording data associated with a plurality of timing events.

As depicted in FIG. 1, logic and control circuitry 22 may be a handheld smart device, such as a telephone, tablet, or the like. The handheld device includes internal timing circuitry, a display and keyboard, and communications circuitry to allow the device to communication with sensors 16, 18 via Bluetooth or Wi-Fi. The smart device executes a program or application operable to establish communication with the sensors 16, 18, detect an impact at the catcher's mitt sensor 16 to begin a timing sequence, detect an impact at the baseman's glove sensor 18 to stop a timing sequence, and a display to present the total elapsed time between the two detected impacts—i.e., the catcher's pop time.

Most preferably, the logic and control circuitry presents an interactive display to a user or coach, allowing the coach to verify that the system is in communication with both sensors 16, 18; to arm or ready the system to begin timing upon a first impact to sensor 16, and to display the recorded pop-time to the coach upon detection of an impact to sensor 18. In alternative embodiments, the logic and control circuitry includes pre-loaded data corresponding to a plurality of players so that a coach can, for example, recall that player's information just prior to initiating a timing sequence (i.e., just prior to timing that player's pop time), and then storing the recorded pop time in a data record corresponding to that player. Most preferably, the time and date of each timing sequence is recorded in conjunction with the data record so that a portfolio of data for a particular player is assembled over time, allowing a coach to review and analyze a player's improvement over time.

In alternative embodiments, further logic and control circuitry, including timing circuitry, coexists with the sensor circuitry and the sensors are in communication with each other over a communications link. In that embodiment, the logic and control circuitry at the sensor can initiate a timing sequence and calculate an overall time upon receiving indication from another sensor. That independently captured time can then be sent to further logic and control circuitry, such as a handheld device or smartphone, or to a logic and control circuitry operable to display the timing result on a display screen or signage. Thus, portions of the logic and control circuitry may be located in conjunction with a sensor, or may be dispersed among a plurality of sensors.

Looking still to FIG. 1, logic and control circuitry 22 is further in communication with one or more devices, such as a computer 28 or other handheld device 26 via a communications network such as the Internet 24. Thus, data collected or recorded by the logic and control circuitry 22 is made available over the communications network 24 to the other devices.

For example, computer 28 may be a central computer or server acting as a central hub to collect and coordinate communication and data captured by one or more systems employing logic and control circuitry 22. Thus, for example, multiple systems including sensors 16, 18 and logic and control circuitry 22 may be deployed, with each system used at separate baseball fields, or at fields in geographically disparate locations, with each system's logic and control circuitry communicating to a single central system or server. Thus, a central system is established to accumulate pop-time data for individuals, player showcases, tryouts, practices, and the like, with each data record correlated to particular player.

As can also be seen in FIG. 1, data can be accessed by multiple users of the system 10 using devices such as handheld device 26. In a manner similar to that just described for accumulating and recording the data, the data may similarly be accessed by users according to permissions granted to that user. For example, during use at a tournament or showcase event, spectators may be allowed access to real time data as the event proceeds, those spectators would not have access to historical data accumulated for those same players. Scouts attending the event may be granted access to real-time data as well as historical data for players, or may be granted access to data for all players on the teams attending, etc. Access and permissions to the data can thus be managed and permitted as desired.

It should be understood that the system 10 is scalable, and may be deployed in varying levels of complexity. Thus, looking to FIG. 2, a minimal system for use by a single coach on a single field for capturing data related to his team can be accomplished by using a single catcher's mitt 12 having an embedded sensor 16 for detecting the impact of a ball caught by a catcher, a single baseman's glove 14 having an embedded sensor 18 for detecting the impact of a ball caught by a baseman, and a single handheld device having logic and control circuitry 22 operable to detect the two impact signals over communications links 20 and to record and display the elapsed time between the two impacts—the catcher's pop time.

As described previously, in alternative embodiments, the logic and control circuitry may be embodied in part in the circuitry of one or more of the sensors, so that the sensors are in communication with each other and operable to initiate and calculate the event time. The captured or calculated time is then transmitted to further logic and control circuitry, such as a handheld smart device as previously described.

In other embodiments, the system can be scaled to a larger system as described above with respect to FIG. 1, with multiple systems deployed and in communication with a central server to allow access to the acquired data by multiple users.

Figure 2:
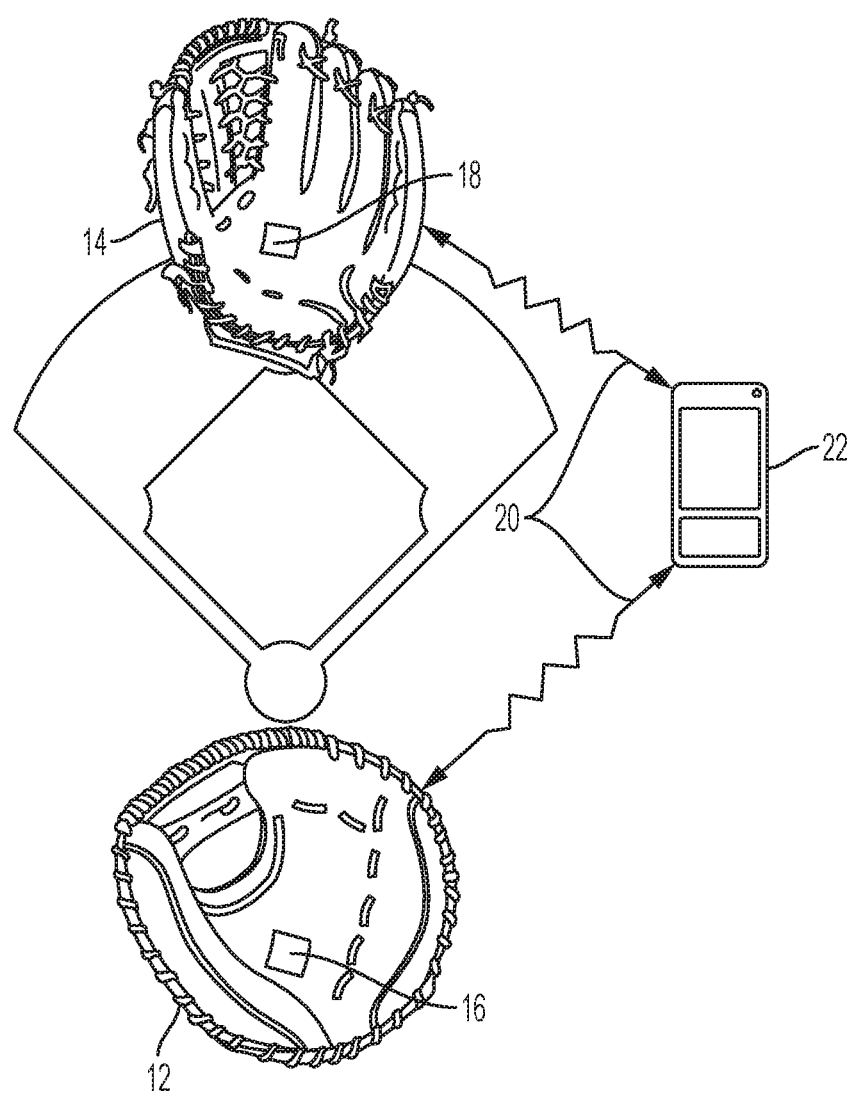
FIG. 2 is a diagrammatic view of a catcher's mitt, baseman's glove, and logic and control circuitry of the present invention shown positioned on a baseball diamond in accordance with an exemplary embodiment of the present invention.

It should be further understood that systems may be deployed and combined as necessary. For example, a stand-alone system as depicted in FIG. 2 can be used and operated by a coach individually without any real-time communication to a central server. However, that same system can later be attached to, or put in communication with, a central system as described with respect to FIG. 1, with the data acquired while operating in standalone mode subsequently transferred to the central system.

As discussed above, sensors 16, 18 may be accelerometer type devices, or other means or mechanism capable of detecting the impact of a ball being caught by a player. Turning to FIGS. 2 through 5, various embodiments of the sensors are depicted and will now be described.

Looking to FIG. 2, as previously discussed, sensors 16, 18 are embedded within a catcher's mitt 12 and baseman's glove 14. The sensor is preferably positioned under the outer cover of the glove, in or near the palm area of the glove. Communications circuitry in the sensor device facilitates wireless communication to the logic and control circuitry 22 over communications links 20. In alternative embodiments, the sensitivity of the sensors may be adjusted via circuitry in the sensor circuit, or may be adjusted by varying the positioning of the sensor on the glove.

Figure 3:
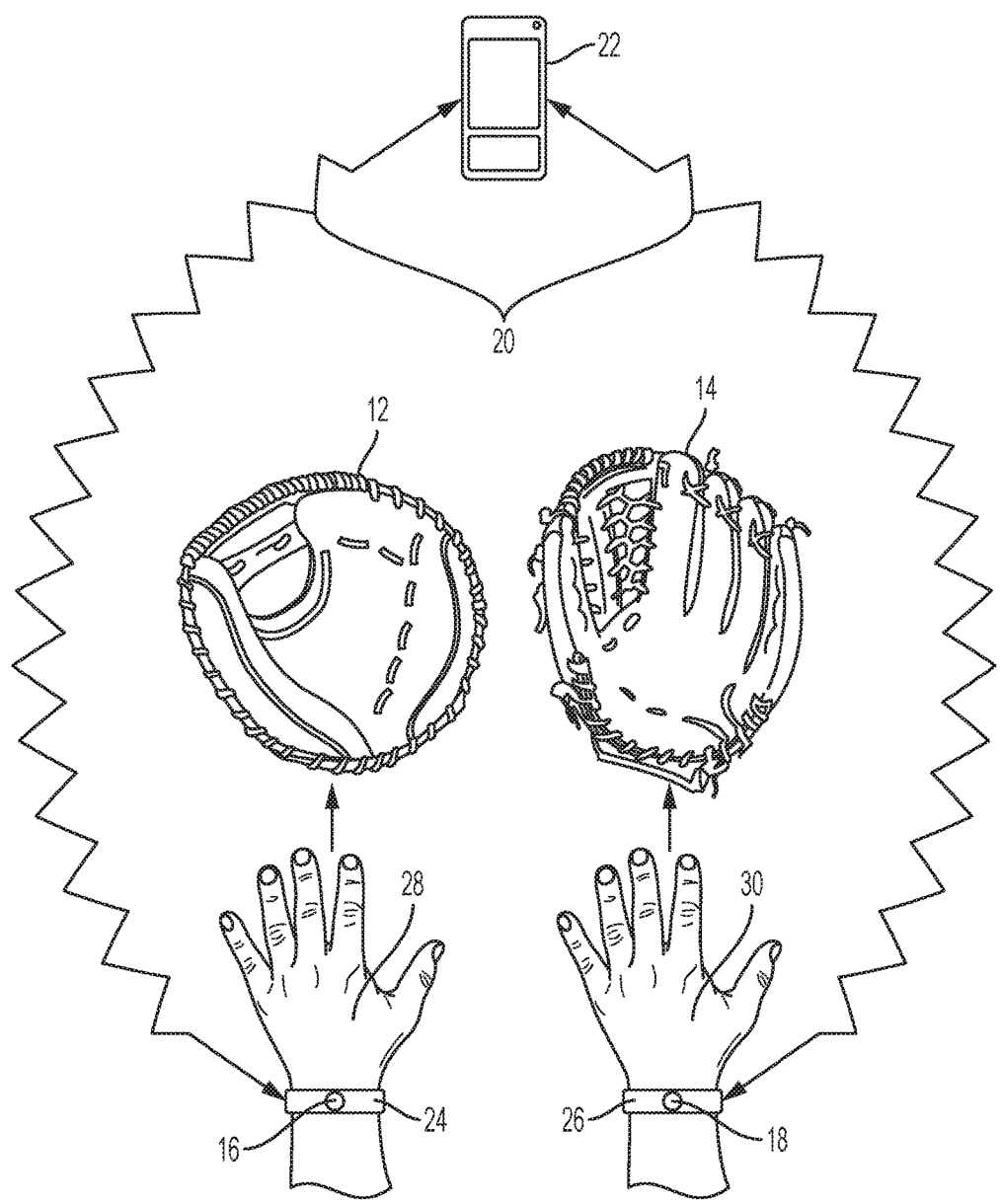
FIG. 3 is a diagrammatic view of an alternative embodiment of the present invention in which sensors are positioned on wristbands worn by users of the system.

Turning to FIG. 3, in an alternative embodiment, the sensors 16, 18 are positioned on wristbands 24, 26 worn by the respective player. With a player's hand inserted into the corresponding glove 14 or mitt 12, the impact of catching a thrown ball is imparted to the player's wrist, and thus to the sensor. A signal indicating the impact is communicated to the logic and control circuitry 22 over communications links 20. As apparent from FIG. 3, the position of the sensor may be varied by the player rotating the wristband 24, 26 about the wrist, or by moving the wristband further up or down on the wrist. It should be understood that the wrist band 24, 26 configurations of FIG. 3 may include smart watches or wrist-worn health or fitness bands that include circuitry for sensing movement or impact, and for communicating wirelessly. Thus, for example, an Apple® Watch may be employed as a wristband sensor, with the watch in communication via Bluetooth, Wi-Fi, or cellular communications network with the logic and control circuitry. Alternatively, a plurality of Apple® Watches or other smart devices, wristbands, etc., can be linked together via a wireless communications network to provide player position and ball impact sensing capability, along with the capability to serve as logic and control circuitry to perform the sensing, time calculations and display functionality of the logic and control circuitry, and/or to send the recorded results to a smartphone, tablet, or central system.

Figure 4:
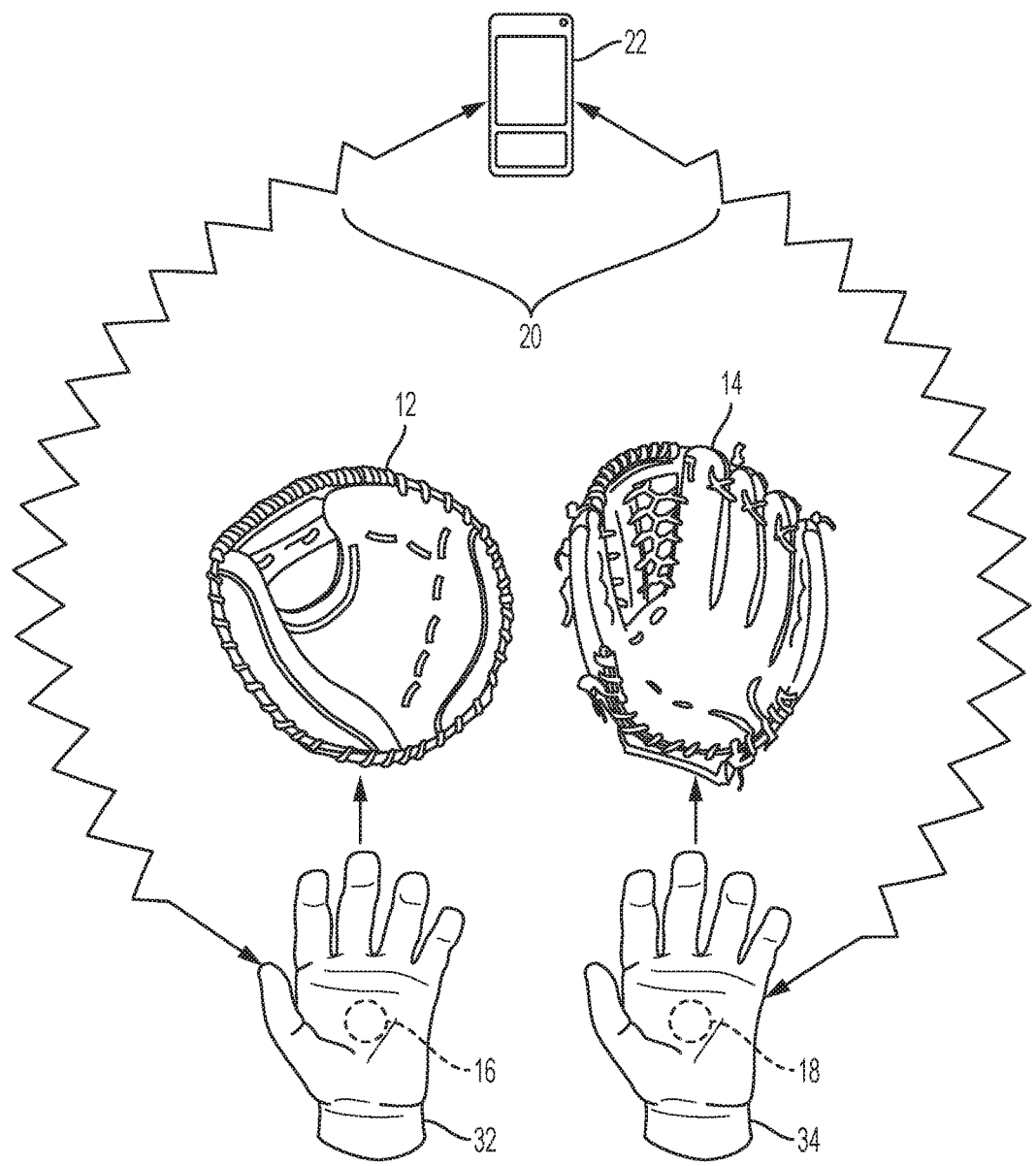
FIG. 4 is a diagrammatic view of an alternative embodiment of the present invention in which sensors are positioned on inner gloves worn by users of the system.

Looking to FIG. 4, in another alternative embodiment, the sensors 16, 18, are positioned in the palm area of form fitting inner gloves 32, 34 worn by the respective player. The gloves 32, 34 are donned prior to the player inserting their hand into the respective glove 14 or mitt 12. The sensors 16, 18 are in communication with logic and control circuitry 22 via communications links 20 in a manner as previously described.

Figure 5:
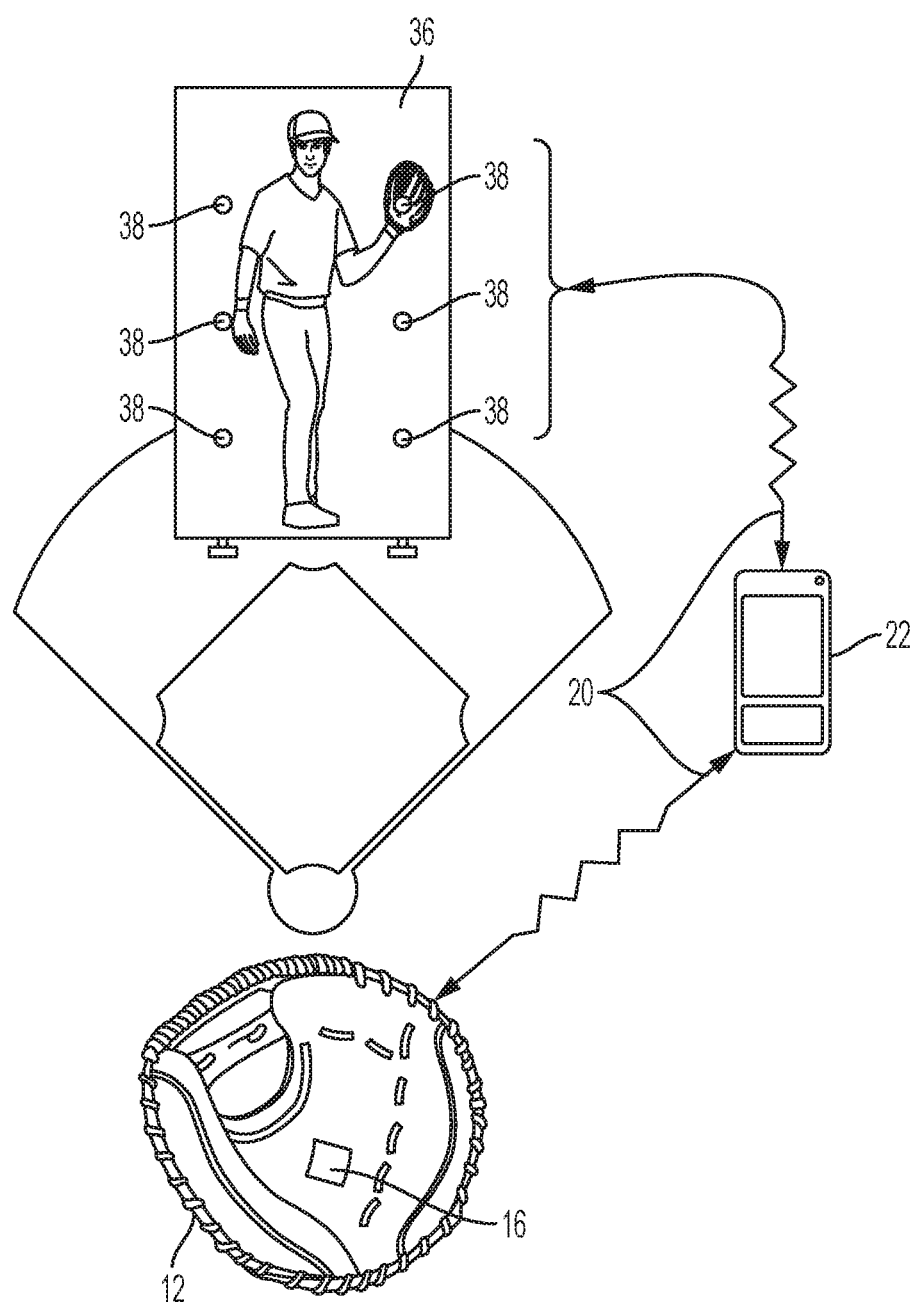
FIG. 5 is a diagrammatic view of an alternative embodiment of the present invention in which a throwing target includes an array of sensors.

Looking to FIG. 5, in another alternative embodiment, the sensors associated with the baseman are comprised of an array of individual sensors 38 positioned on a free standing target 36 that is placed at second base, or other desired target area. In a manner as previously described, a catcher's mitt 12 comprising a sensor 16 is in communication with logic and control circuitry 22 via a communications link 20. Upon detection of an impact at the catcher's mitt 12, the logic and control circuitry 22 begins a timer. The catcher throws to the target, where the impact of the thrown ball is detected by one or more of the sensors 38 on the target. That impact detection is transmitted to the logic and control circuitry via communication link 20, stopping the timer and calculating and elapsed pop-time.

In one embodiment, the multiple sensors 38 are aggregated such that impact at any of the multiple sensors simply triggers a signal indicating impact. In alternative embodiments, the logic and control circuitry for calculating the time is coexistent with the sensor circuitry and the sensors are in communication with each other, with the captured calculated time for the event transmitted to further logic and control circuitry, such as a handheld device.

In other embodiments, in addition to an overall impact signal, the array of multiple sensor provides a signal indicative of the position on the target at which the impact occurred—thus conveying a signal corresponding to the accuracy of the throw. For example, the sensor 38 circuitry is configured to compare the relative strengths of the signals generated by each of the multiple sensors 38, and derive or calculate a signal corresponding to the impact area of the thrown ball. Looking to FIG. 5, if the ball is thrown and directly hits the lower right hand sensor 38 (i.e., a likely target in attempting to throw out a player stealing second base), then the impact at that sensor would be very high, with the impact level at the other sensors being less, and decreasing in intensity the further from the point of impact. Thus, by comparing the signal levels from all of the multiple sensors 38, the circuitry calculates the likely impact point and provides an indication of that impact area to the logic and control circuitry, which in turn translates that information into an accuracy metric. That accuracy metric or data is recorded along with the pop-time data in a manner similar to that previously described.

Figure 6:
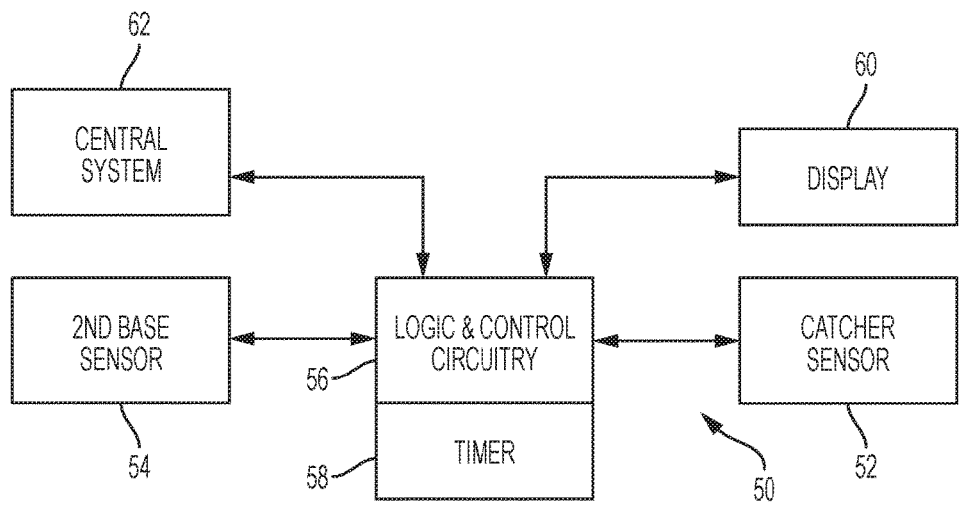
FIG. 6 is a schematic view of a system for measuring the response time of a catcher in accordance with an exemplary embodiment of the present invention.

Looking to FIG. 6, a schematic diagram of a system for measuring a catcher's response time in accordance with an exemplary embodiment of the present invention is depicted generally by the numeral 50. A catcher sensor 52, operable to detect the impact of a catcher catching a thrown ball, is in communication with logic and control circuitry 56. Similarly, a $2^{nd}$ base sensor 54, operable to detect the impact of a second baseman catching a thrown ball, is in communication with the logic and control circuitry 56. The logic and control circuitry 56 includes internal timing circuitry 58, operable to generate a timing signal, preferably to an accuracy of at least one one-thousandth of a second. The logic and control circuitry is in communication with a display 60, operable to present information and data from the logic and control circuitry to a user, and to interact with a user via displays and touch-screen inputs. A central system 62 comprising a processor, computer, or server, memory, and data storage, is in communication with the logic and control circuitry 56.

In operation, the logic and control circuitry 56 presents a user interface via display 60 to a user (e.g. a coach) allowing the user to verify that system is ready for use—e.g., that the logic and control circuitry is in communication with the catcher sensor and the $2^{nd}$ base sensor. Using the touch-screen display 60 or other input device, the user readies and arms the system by pressing an "arm" button on the display. With the system thus armed, the pitcher throws the ball to the catcher. Upon impact of the ball with the catcher's mitt, the catcher sensor 52 signals the logic and control circuitry which begins a timer. After catching the ball, the catcher throws to second base, where the ball impacts the second baseman's glove, triggering the $2^{nd}$ base sensor 54, which transmits a signal to the logic and control circuitry 56. Upon receipt of that signal, the logic and control circuitry stops the timer, and presents on the display 60 the elapsed time between impact signals—the catcher's pop time.

In alternative embodiments, the logic and control timing circuitry is coexistent with the sensor circuitry and the sensors are in communication with each other. After calculating and capturing the time of the event, the sensor logic and control circuitry transmits the data to further logic and control circuitry, such as a handheld device as previously described.

In alternative embodiments, the user may choose to store or delete the just-recorded record. In other embodiments, either before or after recording the data, the user may associate the data record with a particular player, coach, and/or team by entering that data or retrieving that data from memory either stored locally in the logic and control circuitry 56, or stored on a central system 62 in communication with the logic and control circuitry. In alternative embodiments, with a sensor used to detect the lifting of a pitcher's foot after reaching a set position, the system can record the amount of time it takes to throw to first base to try and pick off a base runner.

In alternative embodiments, the user may transfer data from the logic and control circuitry to a central system where the data can be correlated, analyzed, and made available for viewing by a plurality of users. In other embodiments, data from the central system 62 may be transferred to the logic and control circuitry for selection by a user during timing events, or for remote viewing of the data when the logic and control circuitry is not in real-time communication with the central system 62.

Figure 7:
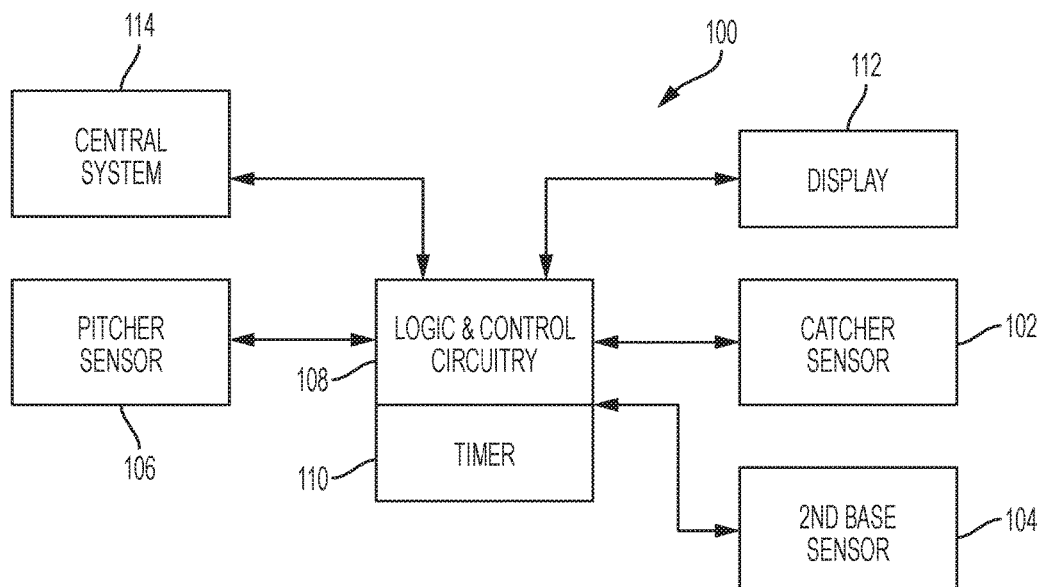
FIG. 7 is a schematic view of a system for measuring a pitcher's release time and a catcher's response time in accordance with an exemplary embodiment of the present invention.

Looking to FIG. 7, a schematic diagram of an exemplary embodiment of the present invention for recording the overall time of a pitch and subsequent throw by a catcher to second base is depicted generally by the numeral 100. A catcher sensor 102, operable to detect the impact of a catcher catching a thrown ball, is in communication with logic and control circuitry 108. Similarly, a 2nd base sensor 104, operable to detect the impact of a second baseman catching a thrown ball, is in communication with the logic and control circuitry 108. A pitcher sensor 106, is operable to detect the lifting motion of a pitcher's stride foot after coming set, is likewise in communication with the logic and control circuitry 108.

It should be understood that the pitcher sensor may be embedded in the pitcher's shoe, similar to the sensors embedded in the gloves or mitts as previously described. Or, the pitcher sensor may be positioned on a band, similar to the wrist band embodiment previously described, and worn on the pitcher's ankle or foot. Rather than detecting an impact, the pitcher sensor detects the upward lifting motion of the pitcher's stride foot after coming set. The pitcher sensor is preferably an accelerometer type sensor.

The logic and control circuitry 108 includes internal timing circuitry 110, operable to generate a timing signal, preferably to an accuracy of at least one one-thousandth of a second. The logic and control circuitry is in communication with a display 112, operable to present information and data from the logic and control circuitry to a user, and to interact with a user via displays and touch-screen inputs. A central system 114 comprising a processor, computer, or server, memory, and data storage, is in communication with the logic and control circuitry 108.

As described previously, the logic and control circuitry may be distributed or dispersed, or arranged alternatively to the depicted configuration. For example, any one, or all, of the sensors may include logic and control circuitry operable to initiate a timing sequence and to communicate with other sensors.

In operation, the logic and control circuitry 108 preferably presents a user interface via display 112 to a user (e.g. a coach) allowing the user to verify that system is ready for use—e.g., that the logic and control circuitry is in communication with the pitcher and catcher sensor and the 2nd base sensor. Using the touch-screen display 112 or other input device, the user readies and arms the system by pressing an "arm" button on the display. With the system thus armed, the pitcher throws the ball to the catcher. When the pitcher starts his or her delivery of the ball to the catcher, the pitcher sensor 106 detects the lifting of the pitcher's stride foot after coming set and transmits a signal to the logic and control circuitry 108 which begins and records a timing signal. Upon impact of the pitched ball with the catcher's mitt, the catcher sensor 102 signals the logic and control circuitry which notes the thus far elapsed time as the pitch time, and allows the timing signal to continue. After catching the ball, the catcher throws to second base, where the ball impacts the second baseman's glove, triggering the 2nd base sensor 104, which transmits a signal to the logic and control circuitry 108. Upon receipt of that signal, the logic and control circuitry stops the timer, and presents on the display 112 the total elapsed time between the pitcher and second base impact signals—the combined overall time from the pitcher's lifting his stride foot and the ball arriving at second base. Preferably, the display also displays the time between the lifting of the pitcher's stride foot and the catch of the ball by the catcher, and the time for the throw from the catcher to second base. In alternative embodiments, the user may choose to store or delete the just-recorded record. In other embodiments, either before or after recording the data, the user may associate the data record with a particular player, coach, and/or team by entering that data or retrieving that data from memory either stored locally in the logic and control circuitry 108, or stored on a central system 114 in communication with the logic and control circuitry.

In alternative embodiments, the user may transfer data from the logic and control circuitry to a central system where the data can be correlated, analyzed, and made available for viewing by a plurality of users. In other embodiments, data from the central system 114 may be transferred to the logic and control circuitry for selection by a user during timing events, or for remote viewing of the data when the logic and control circuitry is not in real-time communication with the central system 62.

From the schematic diagrams of FIGS. 6 and 7, and the description just provided, it can be seen that the system and method of the present invention can be easily adapted to measure various throwing and catching metrics for various players on the ball field. For example, the system can be readily used to measure throwing times for fielders, such as an outfielder catching a ball at a specific marked point and throwing to first base. Or, the time for a routine double play can be measured—e.g., the time a shortstop catching a ball, throwing to second base, and the subsequent throw to first base.

Figure 8:
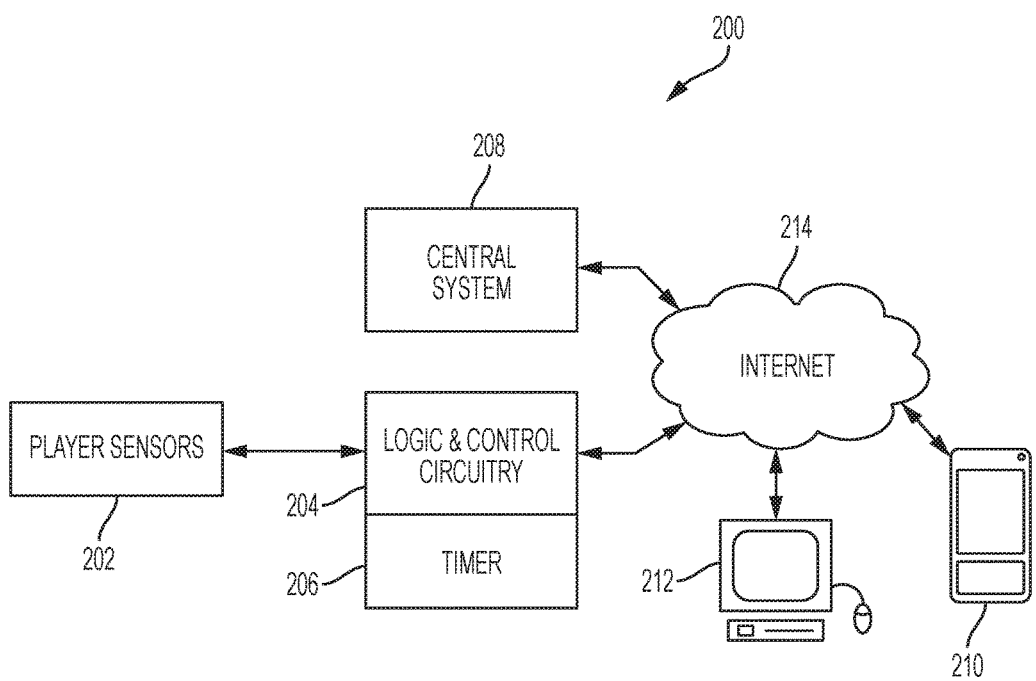
FIG. 8 is a schematic view of a system for measuring player response time in accordance with an exemplary embodiment of the present invention.

Such a general system is depicted in FIG. 8, where a plurality of sensors 202 are in communication with logic and control circuitry 204. The sensors 202 may be any combination of pitcher, catcher, fielder, or target sensors as previously described. The logic and control circuitry 204 detects the various events (e.g., impact of ball, or pitcher lifting stride foot) and captures the interim and aggregate times for the events to occur, using the timing circuitry 206. The recorded data is transferred to a central system 208 for storage, review, and analysis, and the data is made available to multiple users 210, 210 over a network such as the Internet 212.

Figure 9:
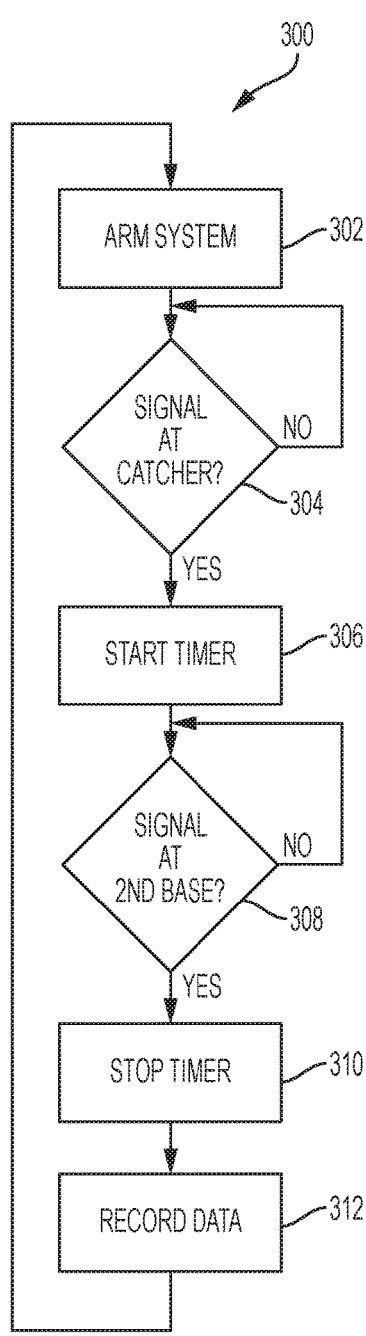
FIG. 9 is a flow diagram of a method for measuring a catcher's response time in accordance with an exemplary embodiment of the present invention.
Figure 10:
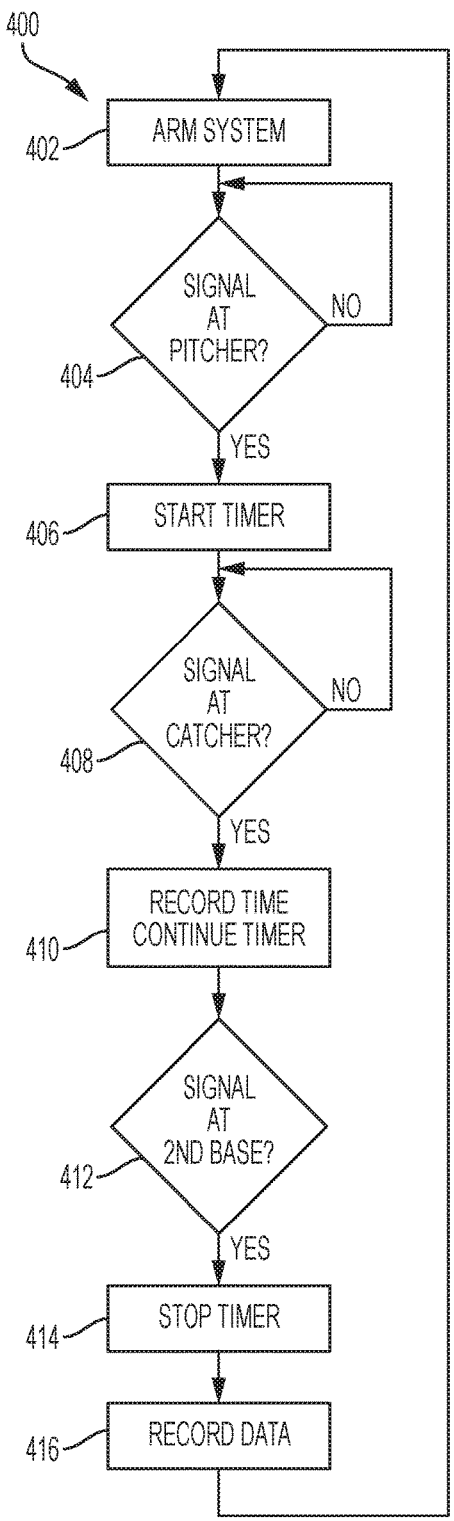
FIG. 10 is a flow diagram of a method for measuring the response time of a plurality of players in accordance with an exemplary embodiment of the present invention.

With various embodiments of systems in accordance with the present invention set forth, turning to FIGS. 9 and 10 flow diagrams of exemplary methods in accordance with the present invention are depicted.

Looking to FIG. 9, an exemplary method for measuring a catcher's pop time is depicted generally by the numeral 300. It should be understood that the method is performed in conjunction with logic and control circuitry as previously described, preferably as a program or application running on a handheld smart device.

At step 302, the system is armed, confirming that the sensors are in communication with the logic and control circuitry and that the circuitry is set to begin timing events. Preferably, a display is presented to a user allowing them to see that the status of the system and to interact with the system using a touch screen display.

At step 304, the logic and control circuitry waits until impact is detected at the catcher's mitt, indicating that the catcher has received a pitched ball. Upon detecting the impact of the ball thrown to the catcher, at step 306 the logic and control circuitry starts a timer. As the timer runs, at step 308 the logic and control circuitry waits until an impact is detected at second base, indicating that the catcher has thrown the ball to second base.

Upon impact at second base, at step 310 the logic and control circuitry stops the timer and at step 312 the total elapsed time—the catcher's pop time—is recorded. As described previously, preferably the recorded data is displayed to the user/coach, and is transferred to a central system for further storage, analysis, and review, and for access by one or more additional users of the system according to the access permissions granted to those users.

Looking to FIG. 10, an exemplary method for measuring a total throwing time—including a pitcher's throw time and a catcher's pop time—is depicted generally by the numeral 400. It should be understood that the method is performed in conjunction with logic and control circuitry as previously described, preferably as a program or application running on a handheld smart device.

At step 402, the system is armed, confirming that the sensors are in communication with the logic and control circuitry and that the circuitry is set to begin timing events. Preferably, a display is presented to a user allowing them to see that the status of the system and to interact with the system using a touch screen display.

At step 404, the logic and control circuitry waits until detection of lifting of the pitcher's stride foot after coming set. Upon detection of the pitcher's motion, at step 406 the logic and control circuitry starts a timer.

At step 408, the system waits for impact at the catcher's mitt, indicating that the catcher has received the pitched ball. Upon detecting the impact of the ball thrown to the catcher, at step 410 the logic and control circuitry records the elapsed time (i.e., the time the pitcher to deliver the ball to the catcher) and lets the timer continue to run. As the timer runs, at step 412 the logic and control circuitry waits until an impact is detected at second base, indicating that the catcher has thrown the ball to second base.

Upon impact at second base, at step 414 the logic and control circuitry stops the timer and at step 416 the total elapsed time is recorded. Thus, the system has recorded the time for the throw from the pitcher to the catcher, and the pop time—the time for the throw from the catcher to second base, as well as the total elapsed time for the overall event. As described previously, preferably the recorded data is displayed to the user/coach, and is transferred to a central system for further storage, analysis, and review, and for access by one or more additional users of the system according to the access permissions granted to those users.

It can be seen that the method just described can be adapted to recording various pitching and throwing sequences, using multiple sensors associated with multiple players, with the interval (player to player) and aggregate (total) time for each event able to be recorded and stored.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A system for measuring a baseball catcher's pop time, comprising:
    a first sensor worn by a catcher and operable to detect the catcher catching a pitched ball;
    a second sensor worn by a baseman and operable to detect the baseman catching a ball thrown by the catcher; and
    logic and control circuitry in communication with the first and second sensors, wherein the logic and control circuitry:
    receives a first signal indicative of the first sensor detecting the catcher catching a pitched ball;
    starts a timer in response to receiving the first signal;
    receives a second signal indicative of the second sensor detecting the baseman catching a thrown ball;
    records a first elapsed time in response to receiving the second signal; and
    stores the first elapsed time.

2. The system of claim 1, wherein the first and second sensors are positioned on a mitt, a glove, a wrist band, or article of clothing worn by the respective first and second players.

3. The system of claim 2, wherein the first and second sensors are selected from the group comprising: accelerometers, motion sensors, sound sensors, pressure sensors, piezoelectric sensors, impact sensors, and combinations thereof.

4. The system of claim 1, wherein the logic and control circuitry is located remotely from the first and second sensors and the first and second sensors are in wireless communication with the logic and control circuitry.

5. The system of claim 1, wherein the logic and control circuitry is at least partially co-located with at least one of the first and second sensors, and wherein the first and second sensors are in wireless communication with each other.

6. The system of claim 5, wherein the logic and control circuitry co-located at the first and second sensors is in communication with logic and control circuitry located remotely from the first and second sensors.

7. The system of claim 1, further comprising a central computer in communication with the logic and control circuitry, wherein the stored elapsed time is associated with an individual player and is transmitted to the central computer.

8. A system for measuring elapsed player response times, comprising:
    a first sensor worn by a first player and operable to detect a movement of the first player;
    a second sensor worn by a second player and operable to detect the second player catching a ball;
    a third sensor worn by a third player and operable to detect the third player catching a ball; and
    logic and control circuitry in communication with the first, second and third sensors, wherein the logic and control circuitry:
    receives a first signal indicative of the first sensor detecting the first player lifting a foot from a set position;
    starts a timer in response to receiving the first signal;
    receives a second signal indicative of the second sensor detecting the second player catching a thrown ball;
    records a first elapsed time in response to receiving the second signal;
    receives a third signal indicative of the third sensor detecting the third player catching a thrown ball;
    records a second elapsed time in response to receiving the third signal; and
    stores the first and second elapsed times.

9. The system of claim 8, wherein the first, second and third sensors are positioned on a shoe, a mitt, a glove, a wristband, a leg band, or article of clothing worn by the respective player.

10. The system of claim 9, wherein the first, second, and third sensors are selected from the group comprising: accelerometers, motion sensors, sound sensors, pressure sensors, piezoelectric sensors, impact sensors, and combinations thereof.

11. The system of claim 8, wherein the logic and control circuitry is located remotely from the first and second sensors and the first, second, and third sensors are in wireless communication with the logic and control circuitry.

12. The system of claim 8, wherein the logic and control circuitry is at least partially co-located with at least one of the first, second, and third sensors, and wherein the first, second, and third sensors are in wireless communication with each other.

13. The system of claim 12, wherein the logic and control circuitry co-located at the first, second, and third sensors is in communication with logic and control circuitry located remotely from the first, second, and third sensors.

14. A method for measuring a baseball player's response time, comprising:
- receiving a first signal from a first sensor worn by a first player indicative of a movement of, or catching of a ball by, the first player;
- starting a timer in response to receiving the first signal;
- receiving a second signal from a second sensor worn by a second player indicative of a movement of, or catching of a ball by, the second player;
- recording a first elapsed time in response to receiving the second signal.

15. The method of claim 14, wherein the first and second sensors are positioned on a mitt, a glove, a wristband, or article of clothing worn by the respective first and second players.

16. The method of claim 15, wherein the first and second sensors are selected from the group comprising: accelerometers, motion sensors, sound sensors, pressure sensors, piezoelectric sensors, impact sensors, and combinations thereof.

17. The method of claim 14 wherein the first and second signals are received by logic and control circuitry.

18. The method of claim 14, wherein the first and second signals are in wireless communication with each other.

19. The method of claim 14, further comprising:
- receiving a third signal from a third sensor worn by a third player indicative of a movement of, or catching of a ball by, the third player;
- recording a second elapsed time in response to receiving the third signal.

20. The method of claim 19, further comprising: calculating and recording a cumulative elapsed time.

21. A system for measuring a baseball catcher's pop time, comprising:
- a first sensor worn by a catcher and operable to detect the catcher catching a pitched ball;
- a sensor array comprising a plurality of sensors positioned in spaced-apart relationship on a target, each of the plurality of sensors operable to detect a thrown ball hitting the target;
- logic and control circuitry in communication with the first and second sensors, wherein the logic and control circuitry:
- receives a first signal indicative of the first sensor detecting the catcher catching a pitched ball;
- starts a timer in response to receiving the first signal;
- receives a second signal indicative of at least one of the plurality of sensors in the sensor array detecting a ball hitting the target;
- records an elapsed time in response to receiving the second signal; and
- stores the elapsed time.

22. The system of claim 21, wherein the logic and control circuitry further:
- receives a plurality of signals from the plurality of sensors in the sensor array indicative of the relative intensity of an impact detected by the respective sensor; and
- calculates a probable position of impact to the target based on the relative intensities and stores a throw accuracy score corresponding to the probable position.

* * * * *